United States Patent Office 3,470,124
Patented Sept. 30, 1969

3,470,124
NEW FLUORINATED COMPOUNDS AND
THEIR PREPARATION
Cyrille Van Eygen, Boitsfort, and Raymond Carpentier, Waterloo, Belgium, assignors to UCB (Union Chimique-Chemische Bedrijven), S.A., Saint-Gilles-Brussels, Belgium
No Drawing. Filed July 5, 1966, Ser. No. 562,511
Claims priority, application Great Britain, July 7, 1965, 28,800/65
Int. Cl. C08f 3/62; C07c 69/62
U.S. Cl. 260—29.6   7 Claims

ABSTRACT OF THE DISCLOSURE

Fluorinated ethylenically unsaturated mixed esters of the formula

R'COO—Y—OOCR'' wherein R'COO is the residue of a perfluoroalkanoic acid containing 2 to 18 carbon atoms; R''COO is the residue of acrylic acid or methacrylic acid; and Y is the residue of an aliphatic dihydric alcohol or a functional derivative thereof, as well as homopolymers thereof and copolymers with acrylic, vinylic and allylic compounds, are oleophobic and are useful in treating fibers, paper, wood, brick and many other materials to protect them from dirt and to make them resistant to wetting by oils, greases, etc. Methods of preparing the said esters and also starting materials are described. Compositions comprising said esters are also disclosed.

The present invention is related to new fluorinated ethylenic compounds, as well as to their homopolymers and copolymers and to compositions containing them. The invention is also related to processes for the production of said new fluorinated compounds, their homopolymers and their copolymers.

The new fluorinated ethylenic compounds according to the present invention have the general formula:

R'COO—Y—OOCR'' wherein:

R'COO is a perfluoroalkanoic acid residue;
R''COO is a residue of a polymerizable alkenoic acid; and
Y is a residue of an organic compound selected from the group consisting of aliphatic, aliphatic-aromatic and aromatic dihydric alcohols as well as the functional derivatives thereof.

The R'COO residue is preferably derived from a perfluoroalkanoic acid containing 2 to 18 carbon atoms. Examples of such acids include perfluorobutyric acid, perfluoropentanoic acid, perfluorohexanoic acid, perfluoroheptanoic acid, perfluorooctanoic acid, perfluorononanoic acid and perfluorodecanoic acid.

The R''COO residue is derived from a polymerizable alkenoic acid, such as acrylic acid and methacrylic acid.

For their use in the production of the new compounds according to the present invention, the alkenoic and perfluoroalkanoic acids may be used in the form of the free acids, their alkali metal or alkaline earth metal salts, their lower alkyl esters, their anhydrides or their halides, preferably their chlorides.

The Y residue is derived from a dihydric aliphatic, aliphatic-aromatic or aromatic alcohol or from a functional derivative thereof, for example, ethylene glycol, propylene glycol, 1,3-propanediol, 1,4-butanediol, 1,5-pentanediol, 1,6-hexanediol, neopentyl glycol, 2,2,4-trimethyl-1,3-pentanediol, and the like. The carbon chain of the alcohol may be interrupted by oxygen atoms and thus there may also be used ether alcohols containing two hydroxyl groups, such as diethylene glycol, triethylene glycol, tetraethylene glycol and the like and dipropylene glycol, tripropylene glycol and the like.

Examples of functional derivatives of the above-mentioned alcohols include 1,2-epoxy compounds, such as ethylene oxide, propylene oxide, butylene oxide and the like.

Other functional derivatives from alcohols which may be used to synthesize the new compounds of the present invention are the halohydrins, such as the chlorohydrins, bromohydrins and iodohydrins of the above-mentioned dihydric alcohols, particularly ethylene chlorohydrin, propylene bromohydrin and the like.

Those halohydrins which are not commercially available can be easily prepared by well-known methods. Thus, for the preparation of chlorohydrins, thionyl chloride can be reacted with the corresponding dihydric alcohol in pyridine or hydrochloric acid can be reacted with the alcohol in the presence of a chlorohydrin extraction solvent.

The new compounds of the present invention can be prepared by the usual processes of esterification. The starting material can be a glycol monoester of an alkenoic acid of the general formula R''COO.Y.OH, which is reacted with a perfluoroalkanoic acid either in the form of the free acid or in the form of a halide, the reaction taking place being represented by the equation:

R''COO.Y.OH+R'.COX→R''COO.Y.OOCR'+HX wherein R'COO, R''COO and Y have the same meanings as above and X is a hydroxyl group or a halogen atom, such as a chlorine, bromine or iodine atom.

The alkenoic acid glycol monoesters used as starting materials can be prepared by the usual methods of esterification, of which the following are some examples:

(1) Condensation of an alkenoic acid with an alkylene oxide;
(2) Condensation of an alkenoic acid halide with a dihydric alcohol;
(3) Condensation of a metallic salt of an alkenoic acid with a dihydric alcohol halohydrin;
(4) Condensation of an alkenoic acid with a dihydric alcohol; and
(5) Transesterification of an alkyl ester of an alkenoic acid with a dihydric alcohol.

These reactions may be performed with an excess of the dihydric alcohol or of a functional derivative thereof.

The new compounds of the present invention are, therefore, fluorinated mixed esters having ethylenic unsaturation. They are dense, viscous liquids of high boiling point which are practically insoluble in water, have a low solubility in saturated aliphatic hydrocarbons and are soluble in acetone, ether and aromatic hydrocarbons.

By reason of their unsaturation, these mixed esters are capable of forming homopolymers, as well as copolymers, with each other and with other copolymerizable monomers, particularly (a) with acrylic derivatives, such as the acrylic and methacrylic esters of straight and branched aliphatic alcohols, and substituted or unsubstituted acrylic and methacrylic amides; (b) with vinyl derivatives, such as vinyl acetate, vinyl chloride, vinylidene chloride, vinyl methyl ether, vinyl methyl ketone, styrene and vinyltoluene; and (c) with allyl derivatives, such as diallyl phthalate, triallyl cyanurate and the like.

The homo- and copolymers can be prepared by the usual methods either in organic solution or in aqueous emulsion in the presence of conventional polymerization catalysts, such as organic and inorganic peroxides, hydroperoxides, per acids, per salts, diazo compounds, redox systems and the like. Polymerization in aqueous emulsion takes place in the presence of anionic, cationic and/or non-ionic surfactants, emulsion stabilizers and the like.

The organic solution or aqueous emulsion of the homopolymers and copolymers of the present invention generally contain 1 to 30% by weight of polymer.

The compounds of the present invention have interesting oleophobic properties. They can be used to treat any porous or non-porous material which it is desired to protect from dirt or to make resistant to wetting by vegetable, animal and mineral oils and greases, hydrocarbons and organic solvents. Examples of such materials include natural and synthetic textile fibres, paper, wood, brick, asbestos, asbestos cement, concrete, leather, hides and the like.

The following examples are given for the purpose of illustrating the present invention, the parts and percentages being by weight, unless otherwise indicated:

EXAMPLE 1.—PREPARATION OF MONOMERS 11.6 g. (0.1 mol) ethylene glycol monoacrylate, 7.9 g. (0.1 mol) pyridine, 0.5 g. hydroquinone and 175 ml. anhydrous ether are placed in a 250 ml. flask equipped with a stirrer, a dropping funnel and a reflux condenser connected to a calcium chloride tube. 43.25 g. (0.1 mol) perfluorooctanoyl chloride are added dropwise within the course of 30 minutes, taking care that the temperature does not exceed 25° C. After the introduction of the acid chloride, the mixture is stirred for a further 20 minutes at room temperature. The pyridine hydrochloride precipitated is filtered off and then washed with ether. The ethereal washing solutions are combined and washed with four portions each of 50 ml. water. The ethereal solution is then dried over anhydrous magnesium sulfate and filtered and the ether evaporated in vacuo. There are obtained 46.7 ethylene glycol acrylate perfluorooctanoate, which corresponds to a theoretical yield of 91%, referred to the perfluorooctanoyl chloride used.

B.P. 242° C./746 mm. Hg; $n_D^{24.5}=1.34718$.

*Analysis.*—Calculated: C, 30.48%; H, 1.38%; F, 55.64%. Found: C, 30.80%; H, 1.48%; F, 55.82%.

Infra-red analysis:

C=C: 1620 and 1635 cm.$^{-1}$
C=O unsaturated ester: 1730 cm.$^{-1}$
C=O fluorinated ester: 1780 cm.$^{-1}$ The following compounds were prepared in a similar manner:

Diethylene glycol methacrylate perfluorooctanoate

Yield: 76%; B.P. 295° C./750 mm. Hg; $n_D^{24.5}=1.36194$.
*Analysis.*—Calculated: C, 33.70%; H, 2.30%; F, 49.98%. Found: C, 33.53%; H, 2.24%; F, 49.80%.

Infra-red analysis:

C=C: 1635 cm.$^{-1}$
C=O unsaturated ester: 1717 cm.$^{-1}$
C=O fluorinated ester: 1780 cm.$^{-1}$ 2,2-dimethyl-1,3-propanediol methacrylate perfluorobutyrate Yield: 93.5%; B.P. 234° C./755 mm. Hg;

$n_D^{24.5}=1.37705$

*Analysis.*—Calculated: C, 42.40%; H, 4.11%; F, 36.12%. Found: C, 41.95%; H, 4.35%; F, 37.97%.

Infra-red analysis:

C=C: 1635 cm.$^{-1}$
C=O unsaturated ester: 1717 cm.$^{-1}$
C=O fluorinated ester: 1775 cm.$^{-1}$ For the preparation of this compound, a new ester was used, namely, 2,2-dimethyl-1,3-propanediol monomethacrylate. This was prepared in known manner from methacrylic acid chloride and neopentyl glycol in the presence of pyridine and hydroquinone in chloroform solution; B.P. 235.5° C./757 mm. Hg; $n_D^{25}=1.44667$.

*Analysis.*—Calculated: C, 62.76%; H, 9.36%. Found: C, 61.88%; H, 9.18%.

Infra-red analysis:

C=C: 1635 cm.$^{-1}$
C=O unsaturated ester: 1715 cm.$^{-1}$ 2-methyl-2-propyl-1,3-propanediol methacrylate perfluorooctanoate Yield: 98%; B.P. 296°C./755 mm. Hg; $n_D^{24.5}=1.36795$.
*Analysis.*—Calculated: C, 38.26%; H, 3.21%; F, 47.79%. Found: C, 38.38%; H, 3.23%; F, 48.60%.

Infra-red analysis:

C=C: 1635 cm.$^{-1}$
C=O unsaturated ester: 1720 cm.$^{-1}$
C=O fluorinated ester: 1780 cm.$^{-1}$ For the preparation of this compound, a new ester was used, namely, 2-methyl-2-propyl-1,3-propanediol monomethacrylate. This was prepared in known manner from methacrylic acid chloride and 2-methyl-2-propyl-1,3-propanediol in the presence of pyridine and hydroquinone in chloroform solution; B.P. 267.5°C./753 mm. Hg.

Infra-red analysis:

C=C: 1635 cm.$^{-1}$
C=O unsaturated ester: 1715 cm.$^{-1}$
OH alcohol: 3420 cm.$^{-1}$ Pentamethylene glycol methacrylate perfluorooctanoate Yield: 95.7%; B.P. 296° C./750 mm. Hg;

$n_D^{27}=1.36402$

*Analysis.*—Calculated: C, 35.93%; H, 2.66%; F, 50.15%. Found: C, 36.20%; H, 2.66%; F, 50.48%.

Infra-red analysis:

C=C: 1635 cm.$^{-1}$
C=O unsaturated ester: 1818 cm.$^{-1}$
C=O fluorinated ester: 1780 cm.$^{-1}$ 2,2-diethyl-1,3-propanediol methacrylate perfluorooctanoate Yield: 87.1%; B.P. 298.5° C./750 mm. Hg;

$n_D^{26}=1.37026$

*Analysis.*—Calculated: C, 38.26%; H, 3.21%; F, 47.79%. Found: C, 38.16%; H, 3.18%; F, 48.47%.

Infra-red analysis:

C=C: 1635 cm.$^{-1}$
C=O unsaturated ester: 1720 cm.$^{-1}$
C=O fluorinated ester: 1780 cm.$^{-1}$ A new ester was used for the preparation of this compound, namely, 2,2-diethyl-1,3-propanediol monomethacrylate. This was prepared in known manner from methacrylic acid chlorine and 2,2-diethyl-1,3-propanediol in the presence of aluminum chloride and hydroquinone in methylene chloride solution; B.P. 264.5°C./753 mm. Hg.

Infra-red analysis:

C=C: 1635 cm.$^{-1}$
C=O unsaturated ester: 1715 cm.$^{-1}$
OH=alcohol: 3400 cm.$^{-1}$ Ethylene glycol methacrylate perfluorooctanoate Yield: 93%; B.P. 253° C./746 mm. Hg; $n_D^{24.5}=1.34821$.
*Analysis.*—Calculated: C, 31.95%; H, 1.72%. Found: C, 31.86; H, 1.78%.

Infra-red analysis:

C=C: 1635 cm.$^{-1}$
C=O unsaturated ester: 1723 cm.$^{-1}$
C=O fluorinated ester: 1783 cm.$^{-1}$ Propylene-1,2-glycol acrylate perfluorooctanoate Yield: 95%; B.P. 241° C./750 mm. Hg; $n_D^{24.5}=1.34716$.

Analysis.—Calculated: C, 31.95%; H, 1.72%; F, 54.16%. Found: C, 33.16%; H, 1.84%; F, 52.84%.
Infra-red analysis:
C=C 1615 and 1633 cm.$^{-1}$
C=O unsaturated ester: 1730 cm.$^{-1}$
C=O fluorinated ester: 1777 cm.$^{-1}$ Propylene-1,2-glycol methacrylate perfluorooctanoate Yield: 97%; B.P. 255° C./755 mm. Hg.
Analysis.—Calculated: C, 33.35%; H, 2.05%. Found: C, 34.20%; H, 2.24%.
Infra-red analysis:
C=C: 1635 cm.$^{-1}$
C=O unsaturated ester: 1720 cm.$^{-1}$
C=O fluorinated ester: 1780 cm.$^{-1}$ 2,2-dimethyl-1,3-propanediol methacrylate perfluorooctanoate Yield: 83.5%; B.P. 277° C./750 mm. Hg;
$n_D^{24.5} = 1.36138$
Analysis.—Calculated: C, 35.93%; H, 2.66%; F, 50.15%. Found: C, 35.99%; H, 2.74%; F, 49.50%.
Infra-red analysis:
C=C: 1635 cm.$^{-1}$
C=O unsaturated ester: 1720 cm.$^{-1}$
C=O fluorinated ester: 1780 cm.$^{-1}$ 2,2-diethyl-1,3-propanediol acrylate perfluorooctanoate Yield: 92% B.P. decomposition and polymerization.
Analysis.—Calculated: C, 37.12%; H, 2.94%; F, 48.94%. Found: C, 35.68%; H, 2.62%; F, 49.09%.
Infra-red analysis:
C=C: 1617 and 1633 cm.$^{-1}$
C=O unsaturated ester: 1730 cm.$^{-1}$
C=O fluorinated ester: 1780 cm.$^{-1}$ 1,3-propanediol methacrylate perfluorooctanoate Yield: 87%; B.P. 271–273° C./763 mm. Hg.
Analysis.—Calculated: C, 33.35%; H, 2.05%; F, 52.75%. Found: C, 33.40%; H, 1.99%; F, 52.97%.
Infra-red analysis:
C=C: 1635 cm.$^{-1}$
C=O unsaturated ester: 1720 cm.$^{-1}$
C=O fluorinated ester: 1780 cm.$^{-1}$ 2,2-dimethyl-1,3-propanediol acrylate perfluorooctanoate Yield: 90%; B.P. decomposition and polymerization.
Analysis.—Calculated: C, 34.67%; H, 2.36%; F, 51.42%. Found: C, 35.63%; H, 2.42%; F, 49.50%.
Infra-red analysis:
C=C: 1617 and 1633 cm.$^{-1}$
C=O unsaturated ester: 1730 cm.$^{-1}$
C=O fluorinated ester: 1780 cm.$^{-1}$ 1,4-butanediol methacrylate perfluorooctanoate Yield: 84%; B.P. 302° C./763 mm. Hg.
Analysis.—Calculated: C, 34.67%; H, 2.36%; F, 51.42%. Found: C, 35.74%; H, 2.54%; F, 49.72%.
Infra-red analysis:
C=C: 1635 cm.$^{-1}$
C=O unsaturated ester: 1720 cm.$^{-1}$
C=O fluorinated ester: 1780 cm.$^{-1}$

EXAMPLE 2.—POLYMERIZATION OF ETHYLENE GLYCOL ACRYLATE PERFLUOROOCTANOATE 132 g. distilled water, 13 g. acetone, 4.4 g. trimethyl octadecyl ammonium chloride in solution (50% of the ammonium salt, 13% water and 37% isopropanol), 0.88 g. alpha,alpha'-azo-bis-isobutyramidine dihydrochloride are placed in a 250 ml. flask equipped with a stirrer, a dropping funnel and a vertical condenser and a tube for introducing nitrogen. This mixture is heated to 65° C., while being continuously agitated, and a stream of nitrogen is passed over it, a mixture of 19 g. ethylene glycol acrylate perfluorooctanoate (prepared as in Example 1) and 9 g. acetone being added dropwise in the course of 210 minutes. The product obtained is an emulsion containing 10.6% ethylene glycol acrylate perfluorooctanoate homopolymer.

EXAMPLE 3.—POLYMERIZATION OF ETHYLENE GLYCOL METHACRYLATE PERFLUOROOCTANOATE 66 g. distilled water, 6 g. acetone, 2.2 g. trimethyl octadecyl ammonium chloride in 50% aqueous solution (see Example 2) and 0.44 g. alpha,alpha'-azo-bis-isobutyramidine dihydrochloride are placed in the apparatus used in Example 2. This mixture is heated to 65° C. and stirred, a gentle stream of nitrogen is passed over it and a mixture of 14 g. ethylene glycol methacrylate perfluorooctanoate (prepared as in Example 1) and 5 g. acetone is added dropwise in the course of 3 hours. This mixture is then allowed to cool. The product obtained is an emulsion containing 15% ethylene glycol methacrylate perfluorooctanoate homopolymer.

EXAMPLE 4.—COPOLYMERIZATION OF 2,2-DIMETHYL-1,3-PROPANEDIOL METHACRYLATE PERFLUOROOCTANOATE WITH N-METHYLOL-ACRYLAMIDE 60 g. distilled water, 7.4 g. acetone, 0.3 g. N-methylol-acrylamide, 1 g. trimethyl-octadecyl ammonium chloride in 50% aqueous solution (see Example 2), 0.8 g. alpha,alpha'-azo-bis-isobutyramidine dihydrochloride are introduced into the same apparatus as in Example 2. A stream of nitrogen is passed over the reaction components while mixing and heating them to 65° C. A mixture of 2.32 g. 2,2-dimethyl-1,3-propanediol methacrylate perfluorooctanoate (prepared as in Example 1) and 4 g. acetone is added dropwise in the course of one hour. After cooling, an emulsion is obtained which contains 3.4% of the copolymer of 2,2-dimethyl-1,3-propanediol methacrylate perfluorooctanoate and N-methylol-acrylamide, 3% of which are due to the fluorinated comonomer.

EXAMPLE 5.—BLOCK POLYMER OF 2,2-DIMETHYL-1,3-PROPANEDIOL METHACRYLATE PERFLUOROOCTANOATE, 2-ETHYLHEXYL ACRYLATE AND N-METHYLOL-ACRYLAMIDE 73.5 ml. water, 2.5 g. trimethyl octadecyl ammonium chloride in solution (50% of the ammonium salt, 13% water and 37% isopropanol), 0.5 g. alpha,alpha'-azo-bis-isobutyramidine dihydrochloride and 7.5 g. acetone are introduced into a 250 ml. flask equipped with a stirrer, a dropping funnel and a condenser. A gentle stream of nitrogen is passed over the reaction mixture which is heated to and maintained at 65° C. A mixture of 2 g. 2,2-dimethyl-1,3-propanediol methacrylate perfluorooctanoate and 2 g. acetone is then added dropwise in the course of half an hour. 0.066 g. N-methylol-acrylamide are then added, followed by the dropwise addition of a mixture of 6.6 g. 2-ethylhexyl acrylate and 3 g. acetone in the course of one hour. The reaction is continued for 10 minutes and then the emulsion obtained is allowed to cool. The product obtained is an emulsion of a copolymer of 2% 2,2-dimethyl-1,3-propanediol methacrylate perfluorooctanoate, 6.6% 2-ethylhexyl acrylate and 0.066% N-methylol-acrylamide. The weight ratio of these three constituents of the block copolymer is 30:100:1.

We claim:
1. A fluorinated ethylenically unsaturated compound of the formula

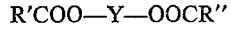

R'COO—Y—OOCR'' wherein:
R'COO is the residue of a perfluoroalkanoic acid containing 2 to 18 carbon atoms,
R''COO is the residue of a polymerizable alkenoic acid selected from the group consisting of acrylic and methacrylic acids, and Y is the residue of an organic compound selected from the group consisting of aliphatic dihydric alcohols and functional derivatives thereof.

2. Polymer of fluorinated ethylenic compound consisting of repeated units having the structure $$-\overset{H}{\underset{H}{\overset{|}{C}}}-\overset{|}{\underset{R}{\overset{|}{C}}}-\overset{O}{\overset{\|}{C}}-O-Y-O-\overset{O}{\overset{\|}{C}}-R'$$

wherein:

R is H or methyl,

R' is a perfluoroalkyl group containing from 1 to 17 carbon atoms, and

Y is the residue of an organic compound selected from the group consisting of aliphatic dihydric alcohols and functional derivatives thereof.

3. Copolymers of fluorinated ethylenically unsaturated compounds containing the repeating units as claimed in claim 2, with copolymerizable monomers selected from the group consisting of acrylic, vinylic and allylic compounds.

4. Solution in organic solvent of polymer as claimed in claim 2.

5. Solution in organic solvent of copolymer as claimed in claim 3.

6. Aqueous emulsion comprising polymer as claimed in claim 2.

7. Aqueous emulsion comprising copolymer as claimed in claim 3.

References Cited

UNITED STATES PATENTS

| | | |
|---|---|---|
| 2,559,750 | 7/1951 | Berry. |
| 2,592,069 | 4/1952 | Reid. |
| 2,642,416 | 6/1953 | Ahlbrecht et al. |
| 2,855,434 | 10/1958 | Fekete. |
| 3,102,103 | 8/1963 | Ahlbrecht et al. |
| 3,304,278 | 2/1967 | Hauptschein et al. |

FOREIGN PATENTS

| | | |
|---|---|---|
| 726,763 | 1/1966 | Canada. |
| 919,324 | 2/1963 | Great Britain. |

MURRAY TILLMAN, Primary Examiner

H. ROBERTS, Assistant Examiner

U.S. Cl. X.R.

260—86.1, 89.5, 486